United States Patent [19]
Gil

[11] 3,995,709
[45] Dec. 7, 1976

[54] AUTOMATIC CONTINUOUS TRANSMISSION

[76] Inventor: Jacob Gil, Deganiot St. 24, Tivon, Israel

[22] Filed: Sept. 30, 1975

[21] Appl. No.: 618,282

[30] Foreign Application Priority Data

Oct. 20, 1974 Israel .................................. 45881

[52] U.S. Cl. .............................. 180/70 R; 74/190
[51] Int. Cl.² ........................................ B60K 17/00
[58] Field of Search ............... 180/70 R, 71, 73 R, 180/73 D, 75; 74/190

[56] References Cited
UNITED STATES PATENTS

| | | | |
|---|---|---|---|
| 694,959 | 3/1902 | Gray | 180/70 R |
| 2,111,422 | 3/1938 | Fawick | 74/190 |
| 3,020,782 | 2/1962 | Sacchi | 74/190 X |
| 3,157,241 | 11/1964 | Callum | 180/71 |
| 3,329,034 | 7/1967 | Welsch | 74/190 |

FOREIGN PATENTS OR APPLICATIONS 916,796   1/1963   United Kingdom ................ 74/190

*Primary Examiner*—M. H. Wood, Jr.
*Assistant Examiner*—Terrance L. Siemens
*Attorney, Agent, or Firm*—Benjamin J. Barish

[57] ABSTRACT

A variable-diameter power-transmission device comprises a rotatable member and a plurality of arms attached at their inner ends to the rotatable member and extending outwardly in a radial direction, the arms being curved at their outer ends in a circumferential direction to provide a generally cylindrical coupling surface for coupling to another device, the arms being flexible, permitting them to flex with respect to the rotatable member to change the radial distance of the outer end of the arms from their inner ends, and thereby to change the effective diameter of the coupling surface.

11 Claims, 12 Drawing Figures

100 # AUTOMATIC CONTINUOUS TRANSMISSION

BACKGROUND OF THE INVENTION

The present invention relates to a variable-diameter power-transmission device, and also to a continuously-variable drive including such transmission device. The invention is particularly useful with respect to continuously-variable drives for automotive vehicles and is therefore described below with respect to that application, but it will be appreciated that the invention, or various features thereof, could advantageously be used in other applications as well.

A number of continuously-variable drives are known for changing the speed of a driven device with respect to the driving device. One popular drive for automotive vehicles includes an automatic transmission having a plurality of gears selectively engageable for changing the speed of the vehicle, but in such transmissions the transmission ratio is changed in steps, each step having a fixed transmission ratio. A number of stepless continuously-variable transmissions are known, e.g. those using cone-shaped pulley wheels, but such transmissions are usually not very efficient, for example because of slippage between the belt and the pulley wheels.

Among the disadvantages of the fixed-ratio transmission systems commonly used today are: (1) the transmission system is complicated, expensive, and costly in maintenance; (2) undue energy losses are produced in the transmission system, particularly when not driving at the most efficient portion of the speed-change range of the transmission; (3) high fuel consumption is involved, which is evident by the substantially higher fuel consumption of automatic transmission vehicles as compared to manual-transmission vehicles.

BRIEF SUMMARY OF THE INVENTION

An object of the present invention is to provide a variable-diameter power-transmission device which is particularly useful in a continuously-variable drive such as for automatic automobile transmission systems.

According to a broad aspect of the present invention, a variable-diameter power-transmission device is provided characterized in that it includes a rotatable member, and a plurality of arms attached at their inner ends to the rotatable member and extending outwardly therefrom in a radial direction. The arms are curved at their outer ends in a circumferential direction to provide a generally cylindrical coupling surface for coupling to another device. The arms are also flexible permitting them to flex with respect to the rotatable member to change the radial distance of their outer ends from their inner ends, and thereby to change the effective diameter of the coupling surface.

According to further aspects, each of the arms includes a fluid passageway and means for applying fluid thereto. The rotatable member includes a central fluid chamber communicating with the inner ends of said arms. The device may further include a fluid pump for applying pressurized fluid to the fluid passageway in the arms to flex the arms and thereby to change the effective diameter of the coupling surface. Alternatively, the fluid may be from a constant pressure source so that the effective diameter of the coupling surface will automatically vary with torque.

According to another aspect of the invention, there is provided a continuously-variable drive including a variable-diameter power transmission device as described above fixed to a drive shaft, and a housing for the device, the housing including a pair of side plates joined by a cylindrical wall, the outer free ends of the radial arms frictionally engaging the inner face of the cylindrical wall for coupling the drive shaft thereto.

The invention is particularly described below for use in an automotive vehicle, wherein each automotive drive wheel is constituted of one of the housings and is driven by one of the variable-diameter power-transmission devices disposed therein.

According to a further feature, the automotive vehicle drive includes steering control means for steering the automotive vehicle by decreasing the diameter of the power-transmission devices on one side of the vehicle with respect to those on the other side thereof.

According to a still further feature, the automotive vehicle drive includes a braking control comprising means for flexing the radial arms to increase the effective diameter of the power-transmission device at the time braking is effected in order to increase the friction of the outer free ends of the arms with respect to the inner surface of the housing cylindrical wall.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENT

Figure 1:
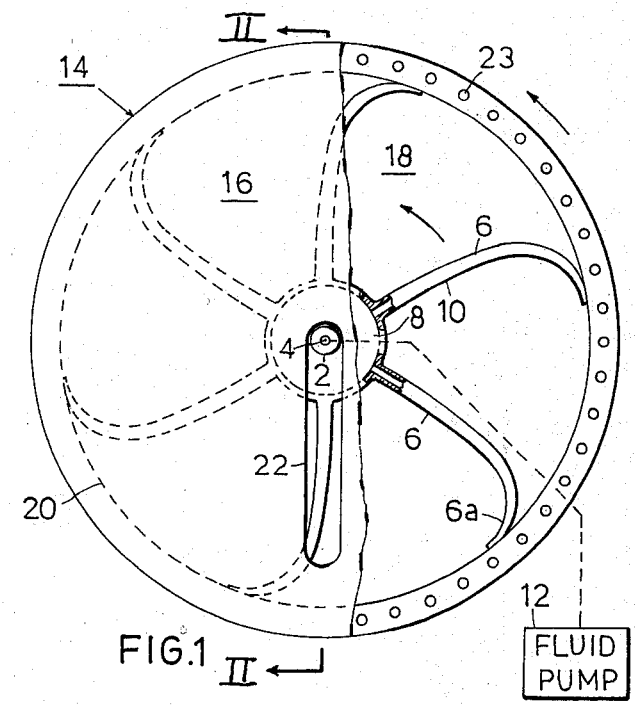
FIG. 1 is a side elevational view, partly broken away, of a variable-diameter power transmission device constructed in accordance with the invention, the device being illustrated in the condition wherein the effective diameter of its coupling surface is at a maximum.

With reference first to FIG. 1, there is shown a variable-diameter power-transmission device constructed in accordance with the invention, portions of the device being removed to better show its structure. Thus the device includes a central rotatable member 2 fixed to a drive axle 4 for rotating in a counter-clockwise direction, as shown in FIG. 1. A plurality of arms 6 are attached at their inner ends to rotatable member 2 and extend outwardly therefrom in a radial direction, the arms being curved at their outer ends in a circumferential direction as shown at 6a. Rotatable member 2 includes a central fluid chamber 8, and each of the radial arms is formed with a fluid passageway 10 extending therethrough communicating at their inner ends with chamber 8 and closed at their outer ends 6a. Central chamber 8 is connected to a fluid pump 12 for pumping fluid, preferably pressurized oil, into the chamber and into the passageways 10 of its radial arms 6, to cause the arms to flex outwardly with increasing pressure.

The power-transmission device illustrated in FIG. 1 further includes a housing, generally designated 14, enclosing the rotatable member 2 and its radial arms 6, and comprises a pair of side plates 16, 18 and a cylindrical wall 20. Side plate 16 of the housing is formed with a radial slot 22 for receiving axle 4 of the rotatable member and permitting it to move in a radial direction with respect to the housing. Side plate 16 does not rotate, and therefore it is rotatably attached to cylindrical wall 20 by a rotary bearing 23. Wall 20, and side plate 18 fixed to it, rotate as a unit.

The outer free ends 6a of the radial arms 6, being curved in a circumferential direction, provide a generally cylindrical coupling surface for coupling the rotatable member 2 and its axle 4 to cylindrical wall 20 of housing 14. That is to say, as the rotatable member 2 is rotated by its axle 4, the outer ends 6a of arms 6 frictionally engage the inner surface of cylindrical wall 20, and thereby rotate that wall and side plate 18 of housing 14.

It will be seen that by controlling the fluid pressure applied by pump 12 to chamber 8 of the rotatable member, and thereby the fluid pressure applied to passageways 10 of its radial arms 6, the degree of flexing of the radial arms can be altered to change the effective diameter of the coupling surface formed by arm ends 6a, and thereby the coupling ratio between the arms and cylindrical wall 20 of housing 14.

FIGS. 1–4 illustrate how the coupling ratio is varied in the foregoing manner.

Figure 2:
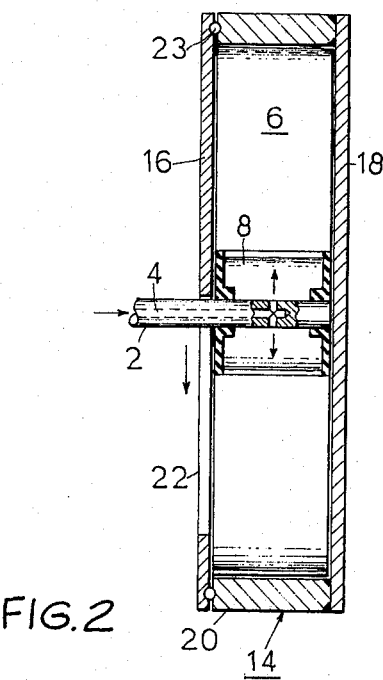
FIG. 2 is a sectional view along lines II — II of FIG. 1.

Thus, FIGS. 1 and 2 show the radial arms 6 at their maximum extended positions, produced by high pressure supplied from the fluid pump 12, such that the outer curved ends 6a of the radial arms provide a coupling surface of the same diameter as the inner diameter of cylindrical wall 20. This produces a 1:1 coupling ratio between rotatable member 2 and housing 14, so that the latter rotates one revolution for each revolution of the rotatable member, assuming no slippage between the two.

Figure 3:
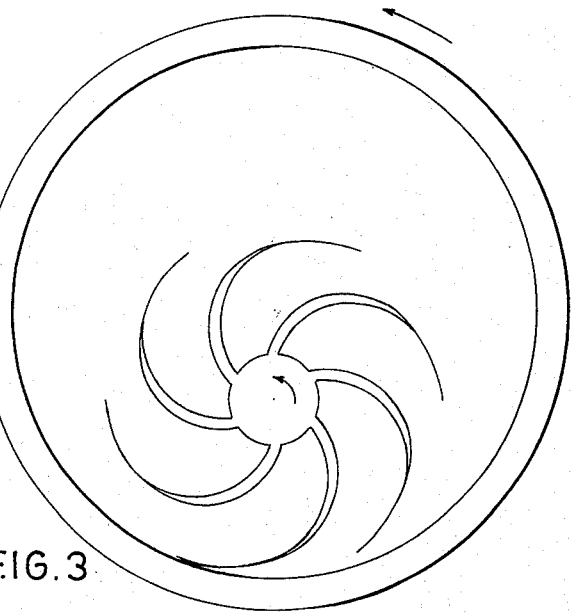
FIGS. 3 and 4 diagrammatically illustrate the device in the conditions wherein the effective diameter of the coupling surface is at an intermediate and minimum value, respectively.

FIG. 3 illustrates the condition wherein less fluid pressure is applied to chamber 8 and to passageways 10 of its radial arms 6, so that the outer curved ends 6a of the radial arms assume a smaller diameter; thus, 1 revolution of the rotary member will produce less than 1 full revolution of housing 14.

Figure 4:
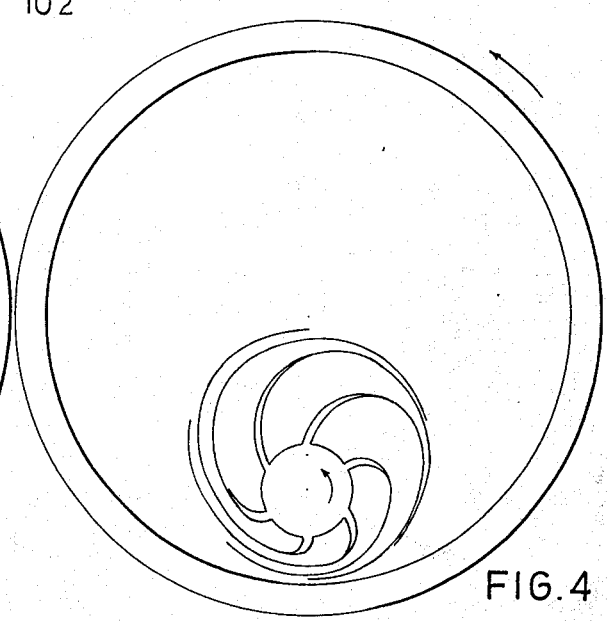

FIG. 4 illustrates the condition wherein radial arms 6 of the rotary member are in their least extended conditions, thereby forming the smallest effective diameter for the rotary member so that one revolution of the rotary member produces a small fraction of a revolution of housing 14.

It will be seen that as the effective diameter of the power-transmission device illustrated in FIGS. 1–4 is changed, by controlling the pressure applied to its chamber 8, the vertical position of axle 4 carried by rotatable member 8 will also vary. This variation in the position of axle 4 is accommodated by radial slot 22 formed in side plate 16 of housing 14.

Figures 5, 6:
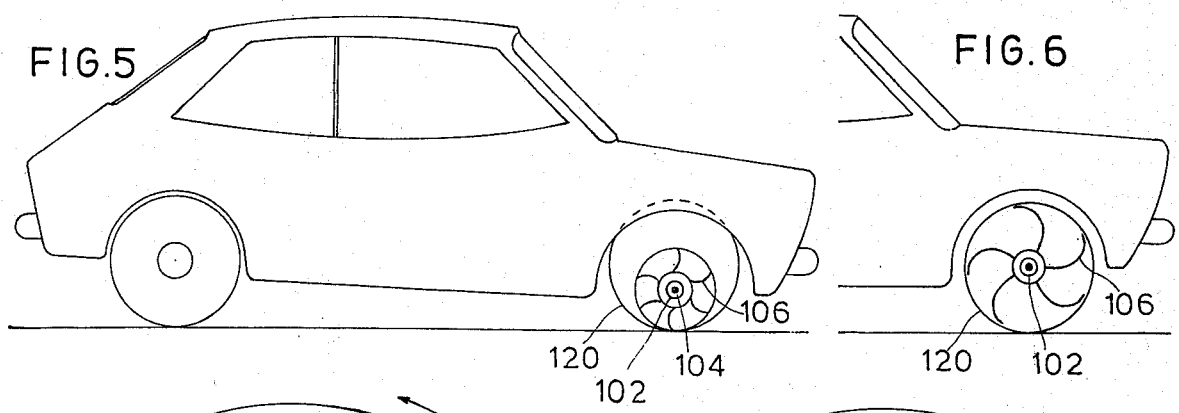
FIGS. 5 and 6 illustrate the device of FIGS. 1–4 used as a continuously-variable automatic transmission for an automotive vehicle.

FIGS. 5 and 6 illustrate the use of the variable-diameter power-transmission device of FIGS. 1–4 included in an automotive vehicle to provide a continuously-variable automatic drive therefor. Thus, the rotatable member 102 is fixed to the wheel axle 104 coupled to the automobile drive shaft, with the outer curved ends of its radial arms 106 frictionally engaging the inner surface of cylindrical wall 120 constituting the, or part of the, automotive drive wheel. Such an arrangement would be provided for each drive wheel of the automobile. FIGS. 5 and 6 illustrate the arrangement used for a two-front-wheel drive, it being appreciated that the other front wheel (that not shown) is provided with a similar arrangement.

It will thus be seen that when low fluid pressure is applied so that the radial arms 106 of the rotatable member 102 assume a small effective diameter (as shown in FIG. 5), there will be provided a low-speed, high-torque coupling to the automotive drive wheel; and when high fluid pressure is applied so that the radial arms 106 are projected outwardly to their maximum effective diameter (as shown in FIG. 6), there will be provided a high-speed, low-torque coupling to the drive wheel.

Radial arms 6 of the power transmission device should be made of a flexible material to permit them to be extended or retracted according to the fluid-pressure applied. Examples of materials that can be used are spring metal and rubber. In the unpressurized condition of the device, the radial arms 6 should be constructed so that they assume the minimum effective diameter, as shown in FIG. 4, the arms being flexed radially outwardly to increase their effective diameter with increasing pressure supplied by the fluid pump 12.

Figures 8, 9:
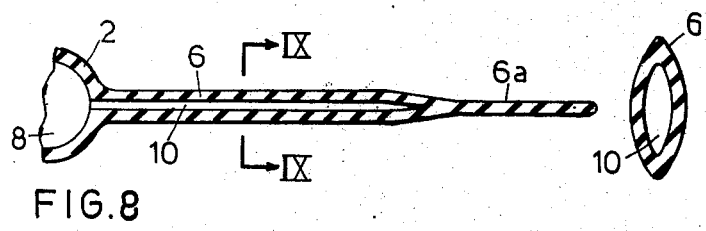
FIGS. 7 and 8 diagrammatically illustrate the construction of one arm of the variable-diameter rotatable member, in its retracted and fully extended positions, respectively.
FIG. 9 is a sectional view along lines IX—IX of FIG. 8 to show the hollow construction of the radial arm.
Figures 1A, 7:
FIG. 1a illustrates a detail of a modification to the device of FIG. 1.

FIGS. 7–9 diagrammatically illustrate the construction of one of the radial arms 6. Thus, its inner end attached to rotatable member 2 is formed with the passageway 10 for the fluid from chamber 8, the passageway being closed at the outer end 6a of the radial arm. The latter end 6a of the radial arm, which end assumes a circumferential curve as shown in FIG. 7 to provide the coupling surface, is preferably of high-friction material such as used in brake linings, to provide a high friction coupling with inner surface 20 of housing 14 in FIG. 1, or with the inner surface 120 of the automobile drive wheel in FIGS. 5 and 6.

Because of the resilient nature of the radial arms 6, they also provide a springy mounting for the automobile, and may therefore obviate the need for the standard automobile springs.

Figure 10:
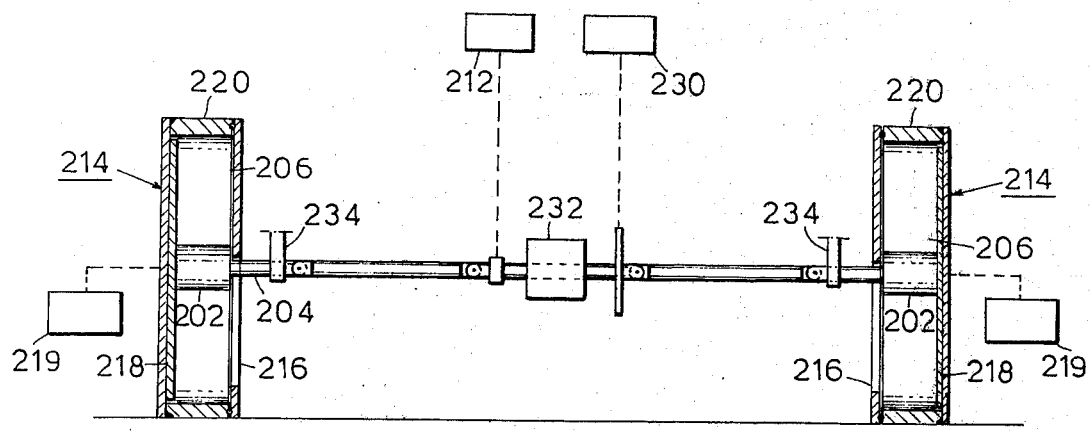
FIG. 10 diagrammatically illustrates a braking control for the continuously-variable automotive drive in accordance with the invention.

When braking the automobile, it is preferred to apply fluid pressure to the power-transmission devices to cause their radial arms to assume their maximum effective diameter, and thereby to increase the braking effect. This is schematically shown in FIG. 10, wherein the radial arms 206 of both wheels 214 are in their maximum diameter condition so as to continuously engage the inner surface of the circumferential wall 220 of the two drive wheels 214. FIG. 10 also illustrates the oil pump 212 for supplying the pressurized oil via axle 204 to the internal chamber of rotatable member 202 to vary the effective diameter of the coupling surface formed by radial arms 206 as described above.

The drive wheels 214 include, in addition to circumferential wall 220 engagable by the outer free ends of the radial arms 206, also the two side plates 216, 218 comparable to side plates 16 and 18 in FIG. 1. In addition, FIG. 10 also schematically illustrates a hydraulic coupling 232 for conveying the pressurized oil from pump 212 to both drive wheels, the brake control system shown by block 230, and the mountings 234 of the automobile body to the drive wheels.

If desired, pressurized oil from further pumps 219 could also be applied to move the rotating side plates 218 against the edges of the arms 206 during braking, thereby increasing the braking effect.

Figure 11:
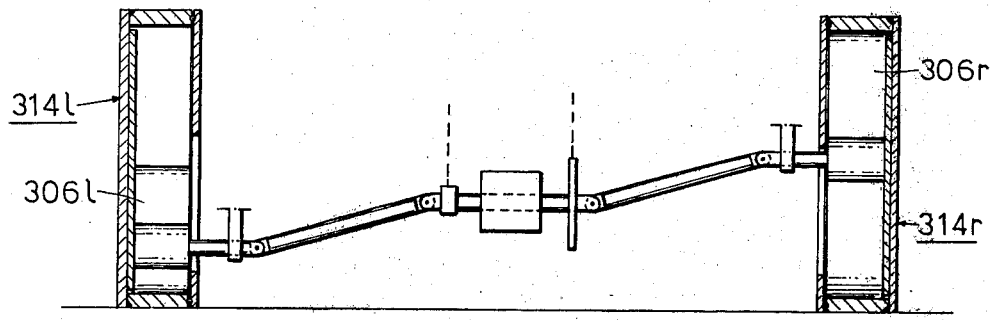
FIG. 11 illustrates a steering control for the continuously-variable automotive drive of FIG. 10.

The novel power-transmission device may also be used for steering the automobile, by changing the effective diameter of the device on one side of the automobile with respect to that on the other side. This is schematically illustrated in FIG. 11, wherein it will be seen that by increasing the pressure within the radial arms 306R coupled to the right vehicle wheel 314R with respect to the radial arms 316L coupled to the left vehicle wheel 314L, the effective diameter of the right power-transmission device coupled to the right wheel 316R will be larger than that coupled to the left wheel 314L. Thus, the right wheel will rotate at a faster speed than the left wheel, causing the automobile to turn leftwardly, or in the clockwise direction illustrated in FIG. 11.

The novel power-transmission device would also provide a number of other advantages in automotive vehicles. Thus, the hydraulic system automatically compensates for the natural tendency of the automobile to lean in the direction away from the turn when making a sharp turn, thereby decreasing the danger of overturning. The hydraulic system also automatically compensates for the tendency of the front end of the vehicle to descent when making a quick step.

While the invention has been described particularly with respect to a continuously-variable automatic drive for automotive vehicles, it will be appreciated that it could be used in other applications. For example, the variable-diameter power-transmission device illustrated in FIGS. 1-4 could be used as a continuously-variable diameter pulley cooperable with a belt. In such a case, the outer curved ends 6a of the radial arms, which change their effective diameter, could be engaged directly by the coupling belt, could be sheathed in a resilient cover, could be connected together by resilient sheets, or could be encased in resilient material such as sponge-rubber. In addition, while the invention has been described with respect to the use of a fluid pump for varying the effective diameter of the power-transmission device, the device could conceivably be used in applications not including the fluid pump, for example in supplying a cushioned coupling between a driving and a driven device, since the inherent resiliency of the outer free ends 6a of the arms will cause them to expand and contract in accordance with the load applied to them thereby tending to cushion changes in load.

Further, the oil pressure applied to the radial arms may be from a constant pressure source so that the effective diameter of the coupling surface formed by the arms, and thereby the speed-ratio, will automatically vary with torque.

Also, a valve may be provided between chamber 8 and the inner end of each arm 6 connected to it, which valve provides a restricted flow of the oil from the chamber into the arm, but an unrestricted flow of the oil from the arm to the chamber. This is schematically shown in FIG. 1a, wherein ball 30 is pressed against a valve seat 32 formed in the juncture between chamber 8 and each radial arm 6, when the oil flows from the chamber to the radial arm, valve seat 32 being formed with one or more recesses 34, to provide a restricted flow from the chamber into the arm, the ball being moved away from the valve seat during the flow in the opposite direction to provide an unrestricted flow from the arm to the chamber. Thus, the oil pressure, which is fixed, does not change the speed-ratio, but only retains the arms in their flexed form as determined by the torque output.

Many other variations, modifications and applications (e.g. toys) of the illustrated embodiment will be apparent.

What is claimed is:

1. A variable-diameter power-transmission device comprising a rotatable member, and a plurality of arms attached at their inner ends to the rotatable member and extending outwardly therefrom in a radial direction, said arms being curved at their outer ends in a circumferential direction to provide a generally cylindrical coupling surface for coupling to another device, said arms being flexible permitting them to flex with respect to the rotatable member to change the radial distance of the outer end of the arms from their inner ends, and thereby to change the effective diameter of said coupling surface.

2. A device according to claim 1, wherein each of said arms includes a fluid passageway, and means for applying fluid thereto.

3. A device according to claim 2, wherein said rotatable member includes a central fluid chamber communicating with the inner ends of said arms.

4. A device according to claim 2, further including a fluid pump for applying pressurized fluid to the fluid passageways in said arms to flex the arms and to change the effective diameter of said coupling surface.

5. A device according to claim 2, wherein said fluid is supplied from a constant pressure source so that the effective diameter of said coupling surface will automatically vary with torque.

6. A continuously-variable drive including a variable-diameter power-transmission device in accordance with claim 4 fixed to a drive shaft, and a housing for said device, said housing including a pair of side plates joined by a cylindrical wall, the outer free ends of the radial arms frictionally engaging the inner face of the cylindrical wall for coupling the drive shaft thereto.

7. A drive according to claim 6, wherein one side plate is formed with a slot receiving the drive shaft of the power-transmission device and permitting same to be displaced therealong as the radial arms of the power-transmission device as flexed to vary the diameter of said coupling surface, said one side plate being rotatably mounted to said cylindrical wall.

8. A drive according to claim 6, wherein the inlet to the fluid passageway of each arm includes a valve providing restricted fluid flow into the arm passageway and unrestricted fluid flow out of the arm passageway.

9. A continuously-variable drive in accordance with claim 6, for an automotive vehicle, wherein each automotive drive wheel is constituted of one of said housings and is driven by one of said variable-diameter power-transmission device disposed therein.

10. An automotive vehicle drive according to claim 9, further including steering control means for steering the automotive vehicle by decreasing the diameter of the power-transmission devices on one side of the vehicle with respect to those on the other side thereof.

11. A drive according to claim 1, further including a braking control comprising means for flexing the radial arms to increase the effective diameter of the power-transmission device at the time braking is effected in order to increase the friction of the outer free ends of the arms with respect to the inner surface of the housing cylindrical wall.

* * * * *